US009258034B2

United States Patent
Cargill et al.

(10) Patent No.: US 9,258,034 B2
(45) Date of Patent: Feb. 9, 2016

(54) METHODS AND APPARATUS FOR COORDINATING COMMUNICATIONS BETWEEN A NFC RADIO AND OTHER COEXISTING RAT RADIOS

(71) Applicant: QUALCOMM Incorporated, San Diego, CA (US)

(72) Inventors: Thomas P. Cargill, San Diego, CA (US); Paul Husted, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 13/786,884

(22) Filed: Mar. 6, 2013

(65) Prior Publication Data

US 2014/0256248 A1    Sep. 11, 2014

(51) Int. Cl.
*H04B 5/00*     (2006.01)
*H04W 56/00*   (2009.01)
*H04W 72/12*   (2009.01)

(52) U.S. Cl.
CPC .............. *H04B 5/005* (2013.01); *H04W 56/00* (2013.01); *H04W 72/1215* (2013.01); *H04M 2250/04* (2013.01)

(58) Field of Classification Search
CPC . H04W 28/18; H04W 72/1215; H04W 84/18; H04W 16/14; H04W 56/00; H04W 72/1242; H04W 72/1247; H04B 5/00; H04B 5/005; H04M 1/7253; H04M 2250/04
See application file for complete search history.

(56) References Cited

U.S. PATENT DOCUMENTS

| 7,149,205 B2 | 12/2006 | Nakamura et al. |
| 7,336,602 B2 | 2/2008 | Silvester |
| 8,344,959 B2 | 1/2013 | Autti et al. |
| 2006/0223536 A1* | 10/2006 | Chia ............................ 455/436 |

(Continued)

FOREIGN PATENT DOCUMENTS

| EP | 1633104 A1 | 3/2006 |
| WO | 2011076385 A1 | 6/2011 |
| WO | 2013015571 A2 | 1/2013 |

OTHER PUBLICATIONS

International Search Report and Written Opinion—PCT/US2014/021112—ISA/EPO—Sep. 18, 2014.

(Continued)

*Primary Examiner* — Lewis West
(74) *Attorney, Agent, or Firm* — Muncy, Geissler, Olds & Lowe, P.C.

(57) ABSTRACT

A method, an apparatus, and a computer program product for wireless communication are provided in connection with reducing interference between NFC communications and other coexisting RAT based communications. In one example, a communications device may include an interface that is equipped to detect that a NFC communication and a coexisting RAT communication are to occur within a threshold time of each other, determine whether the communications will interfere with each other beyond a threshold level of interference, and align timing for the NFC communication and the RAT communication upon a determination that the communications will not interfere with each other beyond the threshold level of interference. In another example, a communications device may include an interface that is equipped to detect that a NFC subsystem has established a NFC connection, and provide a message to another RAT subsystem to establish a link or perform a handover.

40 Claims, 8 Drawing Sheets

(56) References Cited

U.S. PATENT DOCUMENTS

| | | | |
|---|---|---|---|
| 2007/0073929 A1* | 3/2007 | Takayama et al. | 710/51 |
| 2008/0309490 A1* | 12/2008 | Honkanen et al. | 340/572.1 |
| 2009/0180451 A1* | 7/2009 | Alpert et al. | 370/338 |
| 2011/0122829 A1* | 5/2011 | Zetterman et al. | 370/329 |
| 2012/0258662 A1* | 10/2012 | Takayama et al. | 455/41.1 |
| 2014/0148098 A1* | 5/2014 | Song | 455/41.1 |

OTHER PUBLICATIONS

Partial International Search Report—PCT/US2014/021112—ISA/EPO—Jun. 30, 2014.

* cited by examiner

METHODS AND APPARATUS FOR COORDINATING COMMUNICATIONS BETWEEN A NFC RADIO AND OTHER COEXISTING RAT RADIOS

BACKGROUND

The disclosed aspects relate generally to communications between and/or within devices and specifically to methods and systems for reducing interference between NFC communications and other coexisting radio access technology (RAT) based communications.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, near field communication (NFC), etc.

Radio level interference can occur between a Near Field Communication (NFC) based radio and other radios in close proximity (e.g., collocated on the same chip set, same board, etc.) with the NFC radio. Further, current attempts at providing coordinated coexistence are limited by overhead and latencies issues associated with communicating from a host interface (e.g., communication to/from the NFC device or subsystem), up through the application level processor, and to the driver for a coexisting radio access technology (RAT). Such RATs may include, wireless local area network (WLAN) based RATs, wide area network (WAN) based RATs, a Bluetooth (BT) RAT, frequency modulation (FM) based RATs, amplitude modulation (AM) based RATs, etc. Currently, no interface exists to establish direct device level communication and coordination between a NFC controller and other radio subsystems for the purpose of coexistence and interference avoidance. Additionally, NFC polling activities are not synchronized to other RAT activities in a device. This may result in non-optimal power consumption when shared resources such as clocks or power supplies are turned on and off asynchronously by multiple subsystems sharing the resources. Currently, no interface exists to establish direct device level communication and coordination between a NFC controller and other radio subsystems for the purpose of aligning radio activity to optimize platform power consumption.

Thus, improved apparatus and methods for reducing interference between NFC communications and other coexisting RAT based communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with reducing interference between NFC communications and other coexisting RAT based communications. In one example, a communications device may include an interface that is equipped to detect that a NFC communication associated with a NFC subsystem and a coexisting RAT communication associated with a coexisting RAT subsystem are to occur within a threshold time of each other, determine whether the NFC communication and the coexisting RAT communication will interfere with each other beyond a threshold level of interference, and align timing for the NFC communication and the RAT communication upon a determination that the NFC communication and the RAT communication will not interfere with each other beyond the threshold level of interference. In another example, a communications device may include an interface that is equipped to detect that a NFC subsystem has established a NFC connection, and provide a message to another RAT subsystem to establish a link or perform a handover based on the detection.

According to related aspects, a method for reducing interference between NFC communications and other coexisting RAT based communications is provided. The method can include detecting, by an interface, that a NFC communication associated with a NFC subsystem and a RAT communication associated with a coexisting RAT subsystem are to occur within a threshold time of each other. Further, the method may include determining whether the NFC communication and the coexisting RAT communication will interfere with each other beyond a threshold level of interference. Moreover, the method may include aligning timing for the NFC communication and the RAT communication upon a determination that the NFC communication and the RAT communication will not interfere with each other beyond the threshold level of interference.

Another aspect relates to a communications apparatus enabled to reduce interference between NFC communications and other coexisting RAT based communications. The communications apparatus can include means for detecting, by an interface, that a NFC communication associated with a NFC subsystem and a RAT communication associated with a coexisting RAT subsystem are to occur within a threshold time of each other. Further, the communications apparatus can include means for determining whether the NFC communication and the coexisting RAT communication will interfere with each other beyond a threshold level of interference. Moreover, the communications apparatus can include means for aligning timing for the NFC communication and the RAT communication upon a determination that the NFC communication and the RAT communication will not interfere with each other beyond the threshold level of interference.

Another aspect relates to a communications apparatus. The apparatus can include an interface configured to detect that a NFC communication associated with a NFC subsystem and a RAT communication associated with a coexisting RAT subsystem are to occur within a threshold time of each other, determine whether the NFC communication and the coexisting RAT communication will interfere with each other beyond a threshold level of interference, and align timing for the NFC communication and the RAT communication upon a determination that the NFC communication and the RAT communication will not interfere with each other beyond the threshold level of interference.

Still another aspect relates to a computer program product, which can have a computer-readable medium including code for detecting, by an interface, that a NFC communication associated with a NFC subsystem and a RAT communication associated with a coexisting RAT subsystem are to occur within a threshold time of each other. Further, the computer-readable medium can include code for determining whether the NFC communication and the coexisting RAT communication will interfere with each other beyond a threshold level of interference. Moreover, the computer-readable medium can include code for aligning timing for the NFC communication and the RAT communication upon a determination that the NFC communication and the RAT communication will not interfere with each other beyond the threshold level of interference.

According to another related aspect, a method for improving coordination between NFC based communications of other RAT communications is provided. The method can include detecting, by an interface, that a NFC subsystem has established a NFC connection. Moreover, the method may include providing a message, via the interface, to another RAT subsystem to establish a link or perform a handover based on the detection.

Another aspect relates to a communications apparatus enabled to improve coordination between NFC based communications of other RAT communications. The communications apparatus can include means for detecting, by an interface, that a NFC subsystem has established a NFC connection. Moreover, the communications apparatus can include means for providing a message, via the interface, to another RAT subsystem to establish a link or perform a handover based on the detection.

Another aspect relates to a communications apparatus. The apparatus can include an interface configured to detecting that a NFC subsystem has established a NFC connection, and provide a message, via the interface, to another RAT subsystem to establish a link or perform a handover based on the detection.

Still another aspect relates to a computer program product, which can have a computer-readable medium including code for detecting, by an interface, that a NFC subsystem has established a NFC connection. Moreover, the computer-readable medium can include code for providing a message, via the interface, to another RAT subsystem to establish a link or perform a handover based on the detection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, timing of transmissions and receptions associated with a remote NFC device (e.g., peer, tag, reader, etc.), are not coordinated with communications associated other RAT based communications (e.g., WLAN, WAN, BT, FM, AM, etc.). Such communications may interfere with each other. For example, NFC radio transmissions at 13.56 MHz with harmonics of 13.56 Mhz may interfere with reception of WLAN baseband signals using 20 Mhz, 40 Mhz, or 80 Mhz wide channels. In other example, the NFC transmissions at 13.56 MHz with harmonics of 13.56 Mhz may interfere with reception of FM audio in the 76 Mhz to 108 Mhz frequency band. As such, systems and method are described herein to provide coordination between a NFC radio and other coexisting RAT radios.

Figure 1:
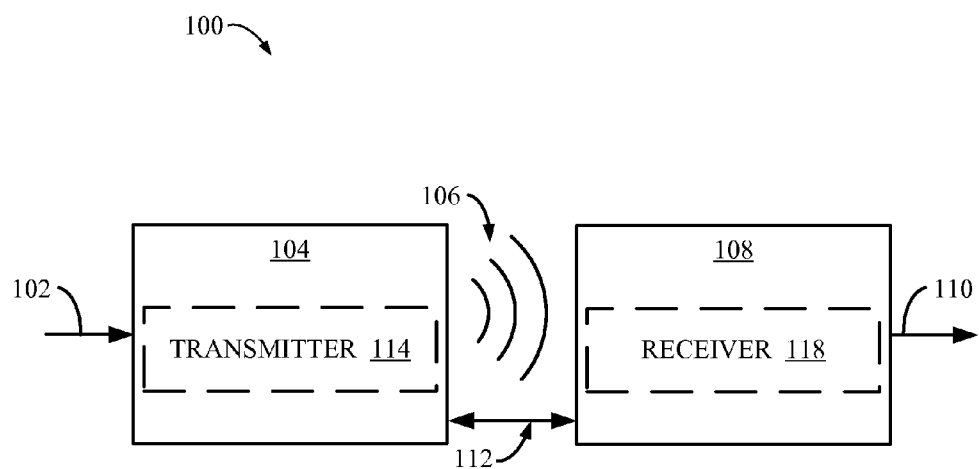
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
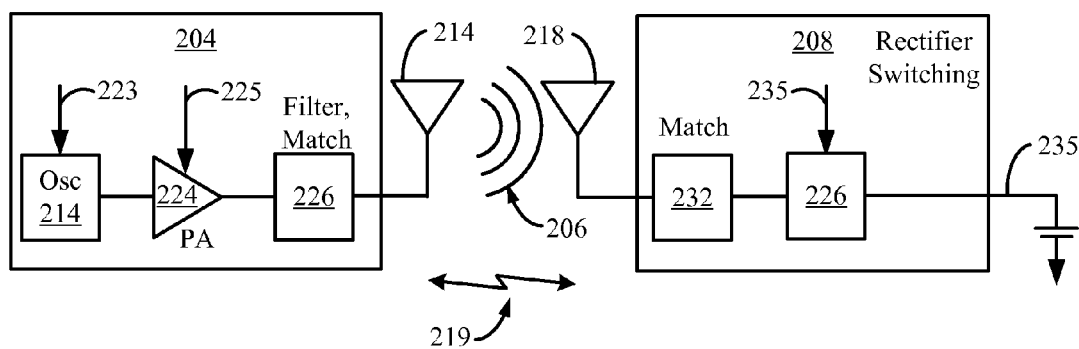
FIG. 2 is a schematic diagram of a wireless communication system, according to an aspect.

FIG. 2 shows a simplified schematic diagram of a near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc).

Figure 3:
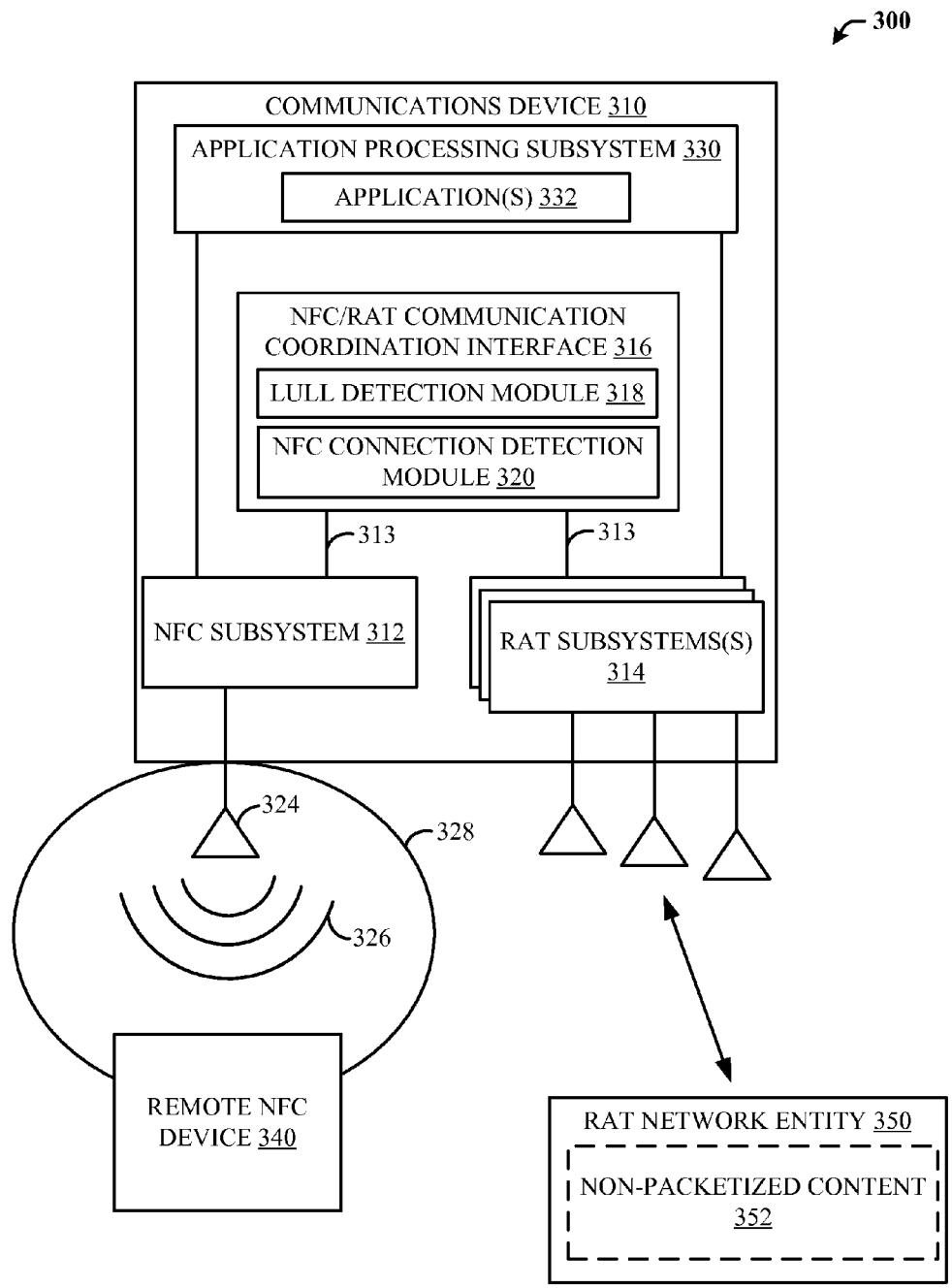
FIG. 3 is a block diagram of an access network environment in which NFC based communications and other RAT based communications are enabled, according to an aspect.

With reference to FIG. 3, a block diagram of a communication network 300 according to an aspect is illustrated. Communications device 310 may include, among other components, NFC/RAT communication coordination interface, NFC subsystem 312, one or more RAT subsystems 314, and application processing subsystem 330. Application processing subsystem 330 may include one or more application 332. In an aspect, applications 332 may be configured to receive, transmit, process, and/or generate content. In such an aspect, the content may be communicated using NFC subsystem 312 and/or the RAT subsystems 314.

NFC subsystem 312 and NFC antenna 324 may be configured to communicate with a remote NFC device 340 within an operating volume 328. In an aspect, remote NFC device 340 may be but are not limited to a tag, a reader/writer device, a peer initiator device, a remote peer target device, etc. NFC subsystem 312 may use one or more NFC based radio frequency (RF) technologies 326 (e.g., NFC-A, NFC-B, NFC-F, etc.). In another aspect, NFC subsystem 312 may include various components such as a NFC controller, a device host, a NFC controller interface (NCI), etc. Further, the one or more RAT subsystems 314 may be configured to communication with one or more RAT network entities 350. In an aspect, RAT network entity 350 may be but is not limited to, a NodeB, an eNodeB, a FM broadcast content provider, an AM broadcast content provider, etc. In an aspect, RAT network entity 350 may facilitate communication of non-packetized content 352 (e.g., FM broadcast, AM, broadcast, etc.). The one or more RAT subsystems 314 may use various wireless communication systems (e.g., code division multiple access (CDMA), time division multiple access (TDMA), frequency division multiple access (FDMA), orthogonal FMDA (OFDMA), single carrier FDMA (SC-FDMA)). A CDMA system includes Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). Further, RAT subsystems 314 may support peer-to-peer (e.g., mobile-to-mobile) ad hoc network systems using unpaired unlicensed spectrums, 802.xx wireless LAN, BLUETOOTH, etc. Still further, RAT subsystems 314 may support various nopacketized radio technologies such as FM, AM, carrier sense multiple access (CSMA), etc.

NFC/RAT communication coordination interface 316 may provide a direct interface 313 between the NFC subsystem 312 and the one or more RAT subsystems 314. In such an aspect, NFC/RAT communication coordination interface 316 may coordinate communications performed by the NFC subsystem 312 and/or the one or more other RAT subsystems 314 while limiting internal communications with application processing subsystem 330. In another aspect, the NFC subsystem 312 and the RAT subsystems 314 may be part of a combination chip set, and the NFC/RAT communication coordination interface 316 may facilitate communications on the combination chip set. In an aspect in which RAT network entity 350 is transmitting non-packetized content 352 for reception by RAT subsystem 314, NFC/RAT communication coordination interface 316 may include a lull detection module 318 that may be configured to detect lulls in the received. In such an aspect, lull detection module 318 may indicate to NFC subsystem 312 where there are lulls in the non-packetized content reception so that NFC subsystem 312 may time transmissions during such lulls. As such, the NFC subsystem 312 transmission may not result in a detectable interference with the reception of the non-packetized content 352 by the RAT subsystem 314. In another aspect, NFC/RAT communication coordination interface 316 may include a NFC connection detection module 320 which may prompt action (e.g., set up a link, perform a handover, etc.) from the RAT subsystem 314 based on detection of an establish communication link by NFC subsystem 312. For example, a connection established by NFC connection can be a trigger for handover from one RAT to another, or as a trigger to establish a link using another RAT. In such an aspect, with a direct interface between NFC and other radio technologies, such as but not limited to WiFi, it becomes possible to enable connection handover user cases without waking the host application processor.

Figure 4:
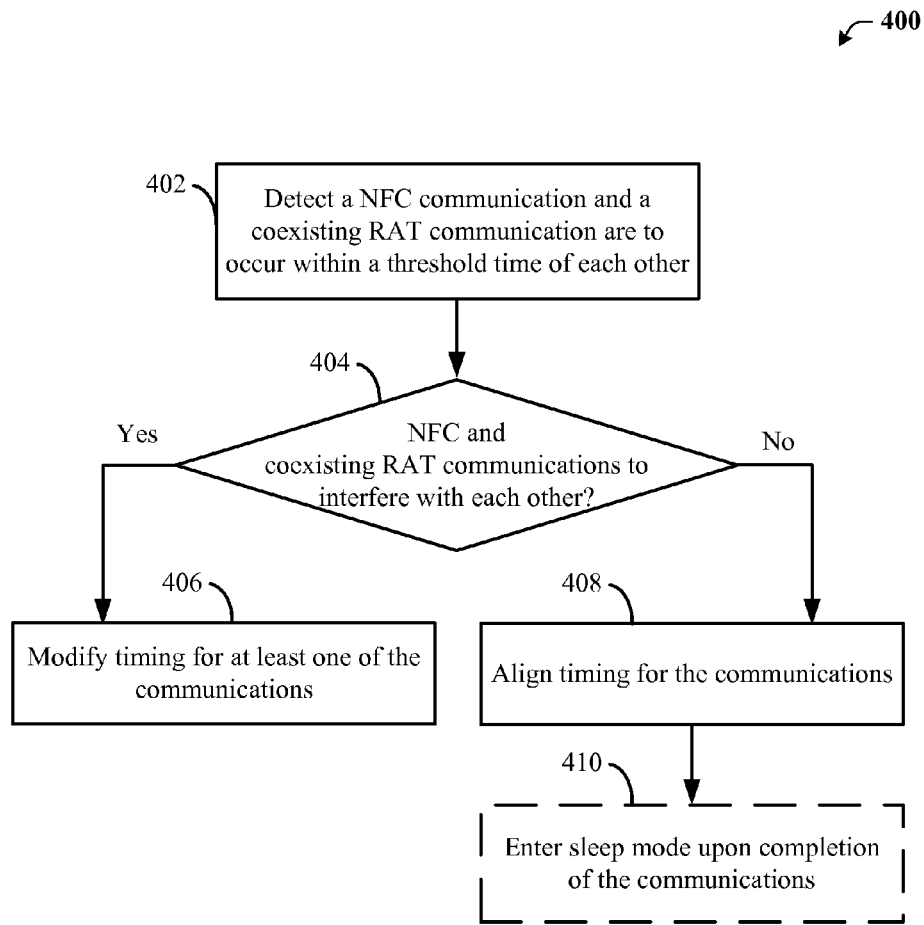
FIG. 4 is a flowchart describing an example for providing coordination between a NFC radio and other coexisting RAT radios, according to an aspect.
Figure 5:
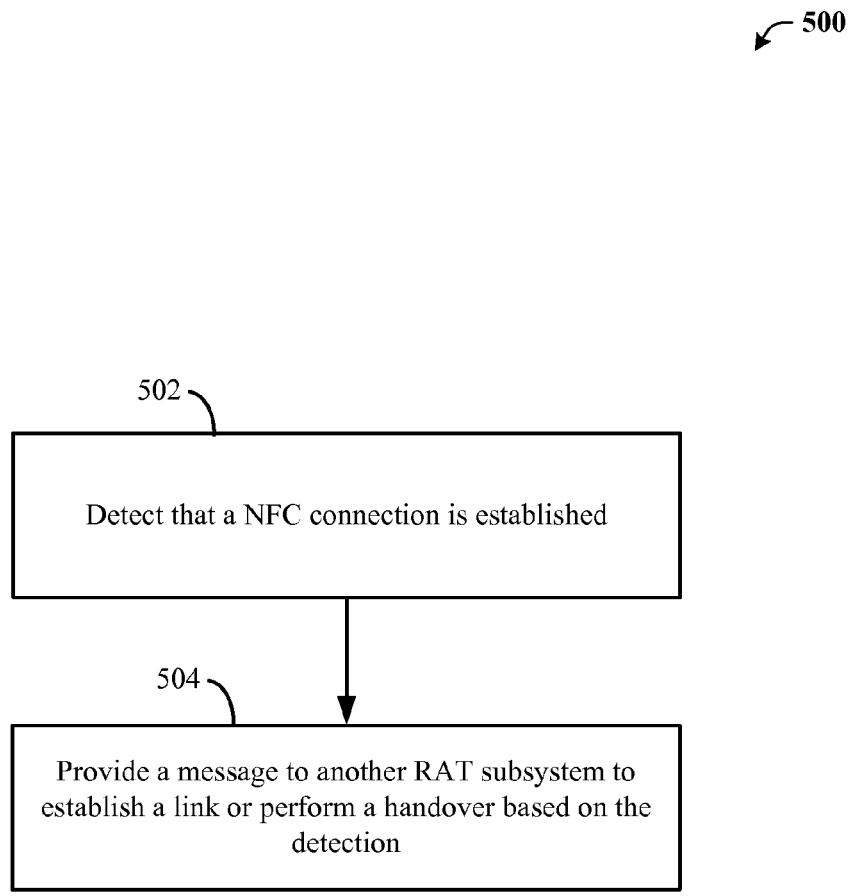
FIG. 5 is a flowchart describing another example providing coordination between a NFC radio and other coexisting RAT radios, according to an aspect.

FIGS. 4-5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 depicts an example flowchart describing a process 400 for providing coordination between a NFC radio and other coexisting RAT radios. In an aspect, the process 400 may be performed by an interface between the NFC controller and the RAT controllers. In an aspect, the interface could be external (e.g., between two or more chips), or internal (e.g., between two subsystems on the same chip). In an aspect, a direct interface may be established between a NFC controller and another wireless connectivity or WAN radio system for the purpose of communicating and coordinating radio activities.

At block 402, a device with an interface between a NFC subsystem and one or more RAT subsystems may detect that a NFC communication and a coexisting RAT communication may occur within a threshold time of each other. An example of potential interference that may occur when a NFC radio transmits at 13.56 MHz with harmonics of 13.56 Mhz. Such NFC transmissions may impact WLAN receive baseband using 20 Mhz, 40 Mhz, or 80 Mhz wide channels. Such NFC transmissions may also impact FM receive audio in the 76 to 108 Mhz frequency band. In an aspect, the interface may be a message based interface with information exchange about current and upcoming radio activity, along with a mutual or one side arbitration for request/grant. In another aspect, the interface may be a non-message based interface with pin based request/grant/priority. In another aspect, the interface may be implemented as a simple strobe to wake or align radio activities between NFC and other radio subsystems.

At block 404, the device may determine whether the NFC communications and any of the RAT communications may interfere with each other beyond a threshold level of interference.

If at block 404, the device determines that the NFC communications and any of the RAT communications will interfere with each other beyond the threshold level of interference, then at block 406, the device may modify timing associated with at least one of the NFC communication or any of the RAT communications. For example, when the NFC subsystem may be configured to transmit for a scheduled polling and a WLAN receiver may be actively receiving and/or may be about to actively receive content, the NFC transmission may be denied or delayed in order to avoid 13.56 MHz NFC RF (and harmonics) negatively affecting the WLAN receive baseband signal. In another example, when the NFC subsystem is configured to transmit and a RAT is actively receiving audio content (e.g., via FM, Bluetooth, WiFi, etc.), an indication to mute and unmute audio content may be communicated to the RAT subsystem to allow for the NFC transmission. In another aspect, the audio content may be analyzed to detect a lull and the NFC transmission may be performed during the detected lull. In such an aspect, the lull may be detected based on a determination that the received content signal does not have a frequency and/or amplitude modulation outside of a threshold value for a threshold time duration. In an aspect, the threshold time duration may be based on a time used for transmission of a NFC based item. In another aspect, the threshold time duration may be user, service provider, content provider, etc., configured.

By contrast, if at block 404, the device determines that the NFC communications and any of the RAT communications will not interfere with each other beyond the threshold level of interference, then at block 408, the device may allow communications to occur as scheduled and/or may align the communications. For example, system level power consumption may be minimized by waking a NFC subsystem when other RATS subsystems (e.g., WAN, WLAN, BT, FM, AM, etc.) are also waking for activity such as delivery traffic indication message (DTIM) processing, page scanning, etc.

Further, in an optional aspect the system level power consumption may be further minimized by, at block 410, entering a sleep mode upon completion of the communications.

FIG. 5 depicts an example flowchart describing another process 500 for providing coordination between a NFC radio and other coexisting RAT radios.

At block 502, a device may detect that a NFC subsystem has established a NFC connection. In an aspect, NFC connection may be based on one or more NFC RF technologies (e.g., NFC-A, NFC-B, NFC-F, etc.). In another aspect, an interface associated with the NFC device may detect the NFC connection without interaction with (e.g., waking up) an application processor.

At block 504, the interface may provide a message to another RAT subsystem to establish a link or perform a handover based on the detection. For example, a NFC connection can be a trigger for handover from one RAT to another, or as a trigger to establish a link using another RAT. In such an aspect, with a direct interface between NFC and other radio technologies, such as but not limited to WiFi, it becomes possible to enable connection handover without waking the host application processor. In an aspect, the interface may provide a direct connection between the NFC subsystem and the RAT subsystems. In such an aspect, the interface, NFC subsystem, and RAT subsystems may be associated with a combination chip set.

Figure 6:
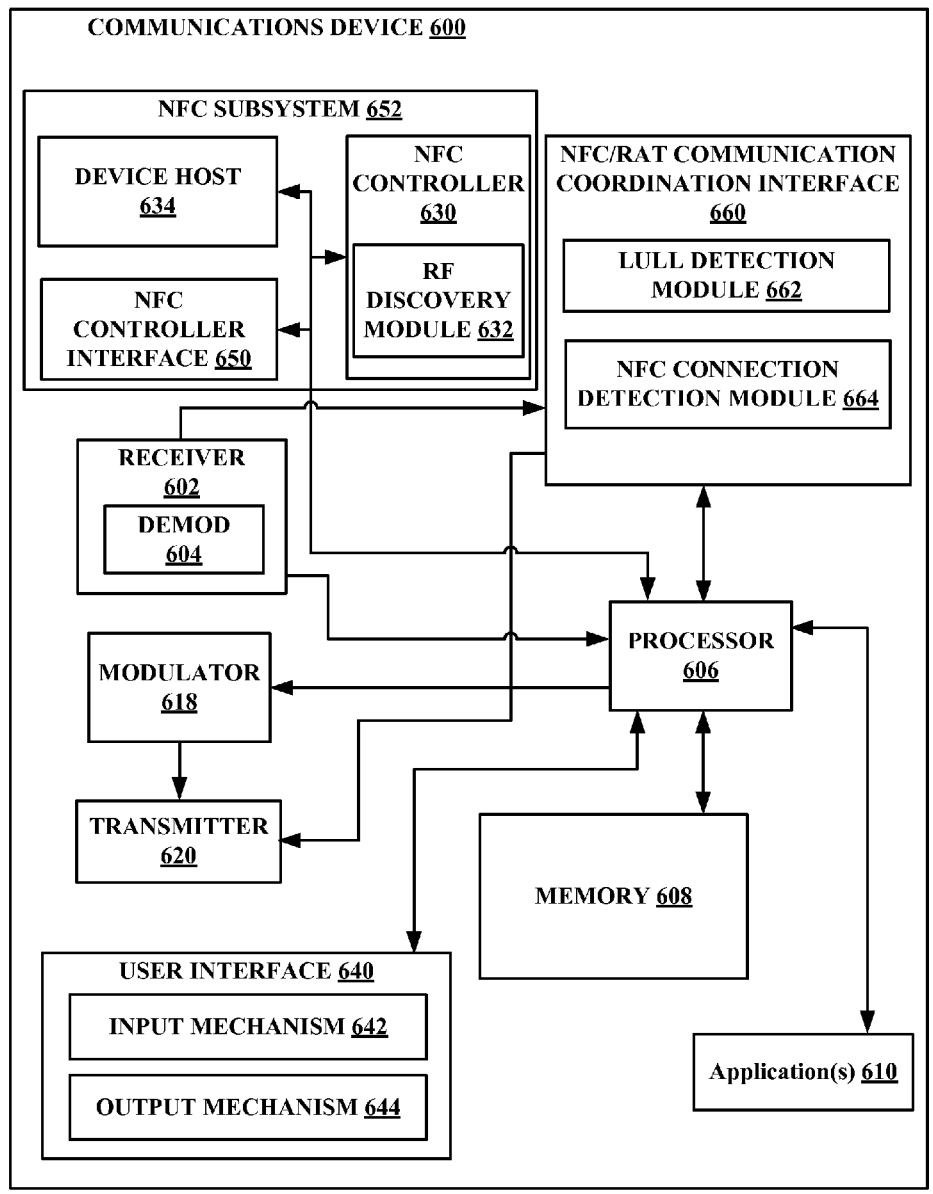
FIG. 6 is a block diagram example architecture of a communications device, according to an aspect.

While referencing FIG. 3, but turning also now to FIG. 6, an example architecture of communications device 600 is illustrated. As depicted in FIG. 6, communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Receiver 602 may further include multiple receivers associated with multiple RATs. For example, receiver 602 may include a NFC receiver and one or more other RAT receivers. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. In an aspect, may further include multiple transmitters associated with multiple RATs. For example, transmitter 620 may include a NFC transmitter and one or more other RAT transmitters. As used herein, a NFC receiver and NFC transmitter may refer to the same NFC coil operable in a listening or polling mode. Further, signals may be prepared for transmission by transmitter 620 through modulator 618 which may modulate the signals processed by processor 606.

Communications device 600 can additionally comprise memory 608 that is operatively coupled to various components, such as but not limited processor 606 and that can store data to be transmitted, received data, information related to available channels, TCP flows, data associated with analyzed signal and/or interference strength, information related to an assigned channel, power, rate, or the like, and any other suitable information for assisting in NFC based communications.

Further, processor 606 and/or NFC/RAT communication coordination interface 660 can provide means for detecting that a NFC communication associated with a NFC subsystem and a coexisting RAT communication associated with a coexisting RAT subsystem are to occur within a threshold time of each other, means for determining whether the NFC communication and the coexisting RAT communication will interfere with each other beyond a threshold level of interference, and means for aligning timing for the NFC communication and the RAT communication upon a determination that the NFC communication and the RAT communication will not interfere with each other beyond the threshold level of interference. In another aspect, processor 606and/or NFC/RAT communication coordination interface 660 can provide means for detecting, by an interface, that a NFC subsystem has established a NFC connection, and means for providing a message, via the interface, to another RAT subsystem to establish a link or perform a handover based on the detection.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Communications device 600 may include a NFC subsystem 652 with a NFC controller 630, device host 634, and NCI 650. In an aspect, NFCC 630 may include RF discovery module 632. RF discovery module 632 may be configurable to perform a discovery process. One aspect of the discovery process may include polling for the presence of one or more remote NFC devices. DH 634 may be configurable to generate a command to prompt NFCC 630 to perform various functions. In an aspect, NCI 650 may be configurable to enable communications between a NFC controller 630 and DH 634. NCI 650 may be configurable to function in a listening mode and/or a polling mode.

In another aspect, communications device 600 may include NFC/RAT communication coordination interface 660. NFC/RAT communication coordination interface 660 may provide a direct interface between the NFC subsystem 652 and one or more RAT subsystems. In such an aspect, NFC/RAT communication coordination interface 660 may coordinate communications performed by the NFC subsystem 652 and/or the one or more other RAT subsystems while limiting internal communications with a processor 606 and/or one or more applications 610. In another aspect, the NFC subsystem 652 and one or more other RAT subsystems may be part of a combination chip set, and the NFC/RAT communication coordination interface 660 may facilitate communications on the combination chip set. In an aspect in which a RAT network entity is transmitting non-packetized content for reception by communications device 600, NFC/RAT communication coordination interface 660 may include a lull detection module 662 that may be configured to detect lulls in the received. In such an aspect, lull detection module 662 may indicate to NFC subsystem 652 where there are lulls in the non-packetized content reception so that NFC subsystem 652 may time transmissions during such lulls. As such, the NFC subsystem 652 transmission may not result in a detectable interference with the reception of the non-packetized content by another RAT subsystem. In another aspect, NFC/RAT communication coordination interface 660 may include a NFC connection detection module 664 which may prompt action (e.g., set up a link, perform a handover, etc.) from a RAT subsystem based on detection of an establish communication link by NFC subsystem 652. For example, a connection established by NFC connection can be a trigger for handover from one RAT to another, or as a trigger to establish a link using another RAT. In such an aspect, with a direct interface between NFC and other radio technologies, such as but not limited to WiFi, it becomes possible to enable connection handover user cases without waking the host application processor.

Although FIG. 6 depicts NFC/RAT communication coordination interface 660 as a separate module, one of ordinary skill in the art would appreciate that the functionality associated with NFC/RAT communication coordination interface 660 may be included within one or more components, such as but not limited to, NFCC 630, DH 634, processor 606, etc. In another aspect, NFC/RAT communication coordination interface 660 configurable to perform any of the functions described with respect to FIGS. 4-5.

Additionally, communications device 600 may include user interface 640. User interface 640 may include input mechanisms 642 for generating inputs into communications device 600, and output mechanism 644 for generating information for consumption by the user of the communications device 600. For example, input mechanisms 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc.

Figure 7:
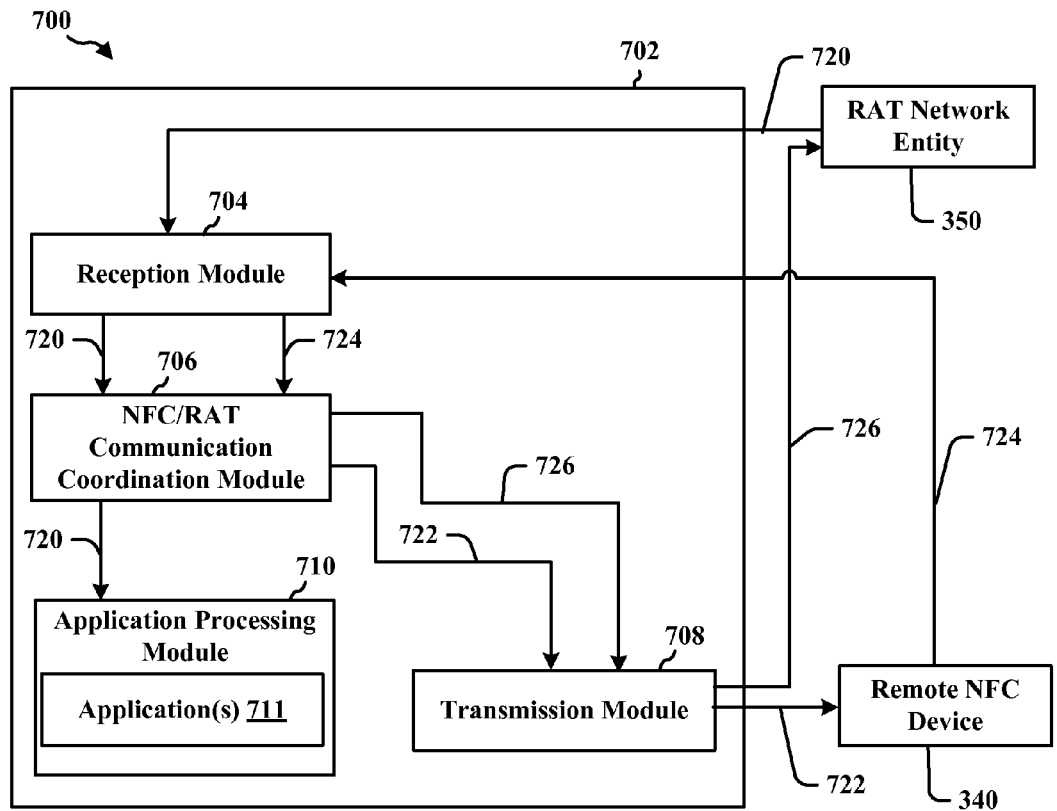
FIG. 7 is a conceptual data flow diagram illustrating the data flow between different modules/means/components in an example apparatus.

FIG. 7 is a conceptual data flow diagram 700 illustrating the data flow between different modules/means/components in an exemplary apparatus 702. The apparatus may be a wireless device (e.g., communications device 600, etc.). The apparatus includes a reception module 704, a NFC/RAT communication coordination module 706, a transmission module 708, and application processing module 710.

In an operational aspect, apparatus 702 (e.g., communications device 600) may receive, through reception module 704, content 720 from a RAT network entity 350. In an aspect, the content may be non-packetized. Reception module 704 may relay the content 720 to NFC/RAT communication coordination module 706 for processing. NFC/RAT communication coordination module 706 may analysis the content to determine whether a NFC transmission may occur without resulting in undue interference to the content 720 to an application processing module 710 for use by one or more applications 711. Further, NFC/RAT communication coordination module 706 may provide the content 720In an aspect, NFC/RAT communication coordination module 706 may estimate whether the NFC transmission 722 will result in interference above a threshold (e.g., SINR) for the received content 720. In another aspect, NFC/RAT communication coordination module 706 may detect a lull in content 720 (e.g., a lull in non-packetized audio content 720) and may coordinate one or more upcoming NFC transmissions 722 to coincide with the detected lull. Based on the analysis performed by NFC/RAT communication coordination module, transmission module 708 may transmit NFC transmission 722 at a specified time for remote NFC device 340.

In another operational aspect, a reception module 704 may receive a confirmation 724 of a successful establishment of a NFC link with a remote NFC device 340. Reception module 704 may relay the confirmation 724 to NFC/RAT communication coordination module 706 for processing. NFC/RAT communication coordination module 706 may determine that one or more actions associated with one or more other RATs may be triggered by reception of the confirmation 724. For example, reception of the confirmation 724 may prompt NFC/RAT communication coordination module 706 to generate a message to trigger a RAT network entity 350 to establish a link, perform a handover, etc. As such, NFC/RAT communication coordination module 706 may enable changes in configurations for one or more RAT subsystems without communications with (e.g., waking up) application processing module 710.

The apparatus may include additional modules that perform each of the steps of the algorithm in the aforementioned call flows and/or flow chart of FIGS. 4 and 5. As such, each step in the aforementioned FIGS. 4 and 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
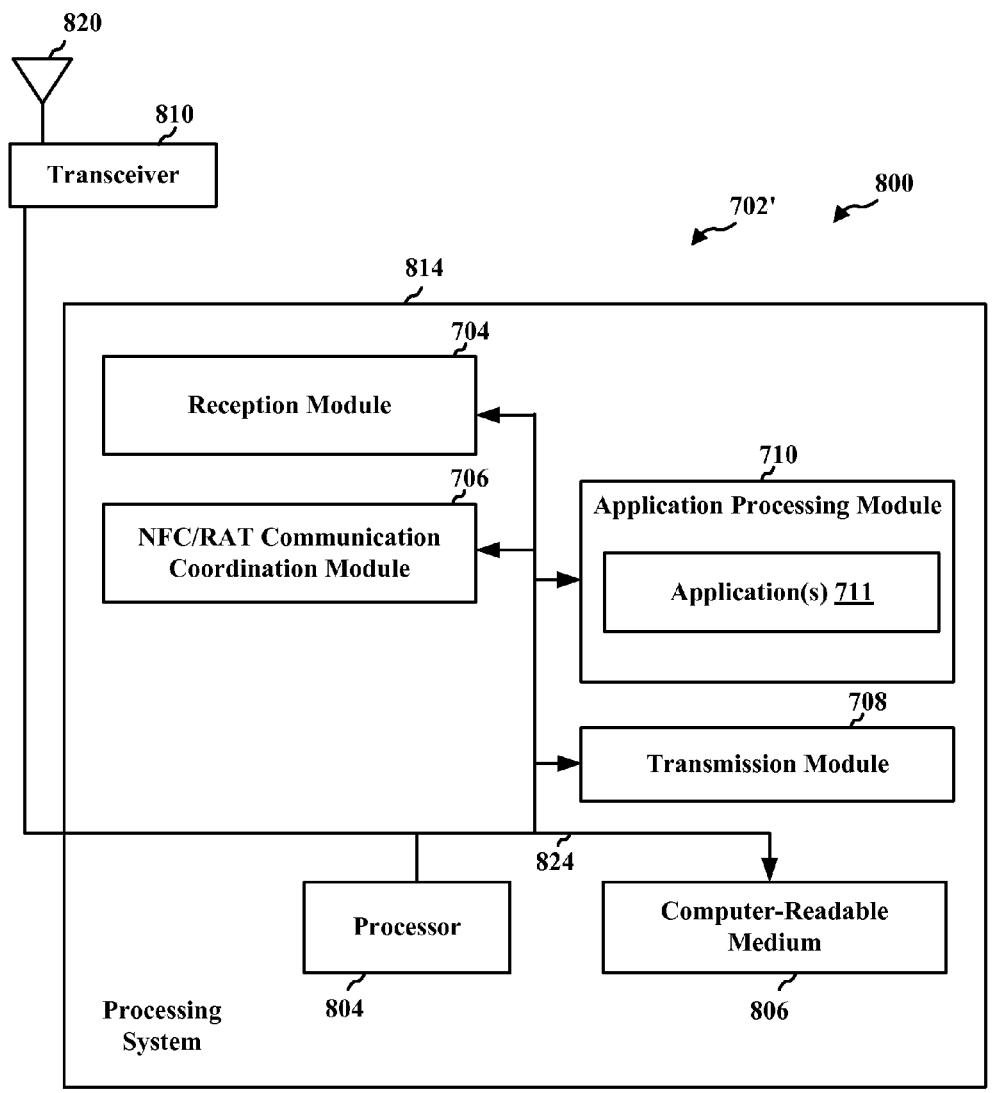
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the modules 704, 706, 708, 710, and the computer-readable medium 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described supra for any particular apparatus. The computer-readable medium 806 may also be used for storing data that is manipulated by the processor 804 when executing software. The processing system further includes at least one of the modules 704, 706, 708, and 710. The modules may be software modules running in the processor 804, resident/stored in the computer-readable medium 806, one or more hardware modules coupled to the processor 804, or some combination thereof In an aspect, the processing system 814 may be a component of the communications device 600 and may include the memory 608 and/or at least one of the processor 606, device host 634, NFC controller 630, and NFC technology detection module.

In one configuration, the apparatus 702/702' for wireless communication includes means for detecting, by an interface, that a NFC communication associated with a NFC subsystem and a coexisting RAT communication associated with a coexisting RAT subsystem are to occur within a threshold time of each other, means for determining whether the NFC communication and the coexisting RAT communication will interfere with each other beyond a threshold level of interference, and means for aligning timing for the NFC communication and the RAT communication upon a determination that the NFC communication and the RAT communication will not interfere with each other beyond the threshold level of interference. In an aspect, apparatus 702/702' may further include means for receiving the data from a remote NFC device. In an aspect, apparatus 702/702' may further include means for modifying a starting time for at least one of the NFC communication or the RAT communication upon a determination that the NFC communication and the coexisting RAT communication will interfere with each other beyond the threshold level of interference. In an aspect, apparatus 702/702' means for modifying may be further configured to detect a lull in non-packetized content reception, and delay a NFC transmission to coincide with the lull In another configuration, the apparatus 702/702' for wireless communication includes means for detecting, by an interface, that a NFC subsystem has established a NFC connection, and means for providing a message, via the interface, to another RAT subsystem to establish a link or perform a handover based on the detection.

As described supra, the processing system 814 may include processor 606 and/or NFC/RAT communication coordination interface 660. As such, in one configuration, the aforementioned means may be the processor 606 and/or NFC/RAT communication coordination interface 660 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configurable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communications for a wireless device, comprising:
  detecting, by an interface, that a near field communication (NFC) communication associated with a NFC subsystem and a coexisting radio access technology (RAT) communication associated with a coexisting RAT subsystem are to occur within a threshold time of each other;

determining whether the NFC communication and the coexisting RAT communication will interfere with each other beyond a threshold level of interference; and aligning timing for the NFC communication and the coexisting RAT communication upon a determination that the NFC communication and the coexisting RAT communication will not interfere with each other beyond the threshold level of interference;

upon determining that the NFC communication and the coexisting RAT communication will interfere with each other beyond the threshold level of interference, performing one of sending an indication to mute to the coexisting RAT subsystem or sending an indication to transmit to the NFC subsystem during a lull in an active transmission phase of the coexisting RAT communication.

2. The method of claim 1, further comprising:
modifying a starting time for at least one of the NFC communication or the coexisting RAT communication upon a determination that the NFC communication and the coexisting RAT communication will interfere with each other beyond the threshold level of interference.

3. The method of claim 1, wherein the interface provides a direct interface between the NFC subsystem and the coexisting RAT subsystem.

4. The method of claim 1, wherein the NFC subsystem and the coexisting RAT subsystem are associated with a combination chip set.

5. The method of claim 2, wherein the NFC communication comprises a NFC transmission, and wherein the coexisting RAT communication comprises a non-packetized content reception, and wherein the modifying further comprises:
detecting a lull in the non-packetized content reception; and
delaying the NFC transmission to coincide with the lull.

6. The method of claim 5, wherein the non-packetized content reception is frequency modulation (FM) content, and wherein the lull is detected based on reception of signal with a frequency that stays within a threshold bound for a threshold duration.

7. The method of claim 5, wherein the non-packetized content reception is amplitude modulation (AM) content, and wherein the lull is detected based on reception of signal with an amplitude that stays within a threshold bound for a threshold duration.

8. The method of claim 1, wherein the NFC communication comprises a NFC polling transmission, and wherein the coexisting RAT communication comprises at least one of: a delivery traffic indication message (DTIM) reception, or page scanning.

9. A method of communications for a wireless device, comprising:
detecting, by an interface, that a near field communication (NFC) subsystem has established a NFC connection;
providing a message, via the interface, to a radio access technology (RAT) subsystem to establish a link or perform a handover based on the detection;
determining whether the NFC connection and the link will interfere with each other beyond a threshold level of interference; and
upon determining that the NFC connection and the link will interfere with each other beyond the threshold level of interference, performing one of sending an indication to mute to the RAT subsystem or sending an indication to transmit to the NFC subsystem during a lull in an active transmission phase of the link.

10. The method of claim 9, wherein the interface provides a direct interface between the NFC subsystem and a coexisting RAT subsystem, and wherein the NFC subsystem and the coexisting RAT subsystem are associated with a combination chip set.

11. A computer program product, comprising:
a non-transitory computer-readable medium comprising code for:
detecting, by an interface, that a near field communication (NFC) communication associated with a NFC subsystem and a coexisting radio access technology (RAT) communication associated with a coexisting RAT subsystem are to occur within a threshold time of each other;
determining whether the NFC communication and the coexisting RAT communication will interfere with each other beyond a threshold level of interference; and
aligning timing for the NFC communication and the coexisting RAT communication upon a determination that the NFC communication and the coexisting RAT communication will not interfere with each other beyond the threshold level of interference;
upon determining that the NFC communication and the coexisting RAT communication will interfere with each other beyond the threshold level of interference, performing one of sending an indication to mute to the coexisting RAT subsystem or sending an indication to transmit to the NFC subsystem during a lull in an active transmission phase of the coexisting RAT communication.

12. The computer program product of claim 11, further comprising code for:
modifying a starting time for at least one of the NFC communication or the coexisting RAT communication upon a determination that the NFC communication and the coexisting RAT communication will interfere with each other beyond the threshold level of interference.

13. The computer program product of claim 11, wherein the interface provides a direct interface between the NFC subsystem and the coexisting RAT subsystem.

14. The computer program product of claim 11, wherein the NFC subsystem and the coexisting RAT subsystem are associated with a combination chip set.

15. The computer program product of claim 12, wherein the NFC communication comprises a NFC transmission, and wherein the coexisting RAT communication comprises a non-packetized content reception, and further comprising code for:
detecting a lull in the non-packetized content reception; and
delaying the NFC transmission to coincide with the lull.

16. The computer program product of claim 15, wherein the non-packetized content reception is frequency modulation (FM) content, and wherein the lull is detected based on reception of signal with a frequency that stays within a threshold bound for a threshold duration.

17. The computer program product of claim 15, wherein the non-packetized content reception is amplitude modulation (AM) content, and wherein the lull is detected based on reception of signal with an amplitude that stays within a threshold bound for a threshold duration.

18. The computer program product of claim 11, wherein the NFC communication comprises a NFC polling transmission, and wherein the coexisting RAT communication comprises at least one of: a delivery traffic indication message (DTIM) reception, or page scanning.

19. A computer program product, comprising:
a non-transitory computer-readable medium comprising code for:
detecting, by an interface, that a near field communication (NFC) subsystem has established a NFC connection;
providing a message, via the interface, to a radio access technology (RAT) subsystem to establish a link or perform a handover based on the detection;
determining whether the NFC connection and the link will interfere with each other beyond a threshold level of interference; and
upon determining that the NFC connection and the link will interfere with each other beyond the threshold level of interference, performing one of sending an indication to mute to the RAT subsystem or sending an indication to transmit to the NFC subsystem during a lull in an active transmission phase of the link.

20. The computer program product of claim 19, wherein the interface provides a direct interface between a NFC subsystem and a coexisting RAT subsystem, and wherein the NFC subsystem and the coexisting RAT subsystem are associated with a combination chip set.

21. An apparatus for communications, comprising:
means for detecting, by an interface, that a near field communication (NFC) communication associated with a NFC subsystem and a coexisting radio access technology (RAT) communication associated with a coexisting RAT subsystem are to occur within a threshold time of each other;
means for determining whether the NFC communication and the coexisting RAT communication will interfere with each other beyond a threshold level of interference;
means for aligning timing for the NFC communication and the coexisting RAT communication upon a determination that the NFC communication and the coexisting RAT communication will not interfere with each other beyond the threshold level of interference; and
means for performing one of sending an indication to mute to the coexisting RAT subsystem or sending an indication to transmit to the NFC subsystem during a lull in an active transmission phase of the coexisting RAT communication upon determining that the NFC communication and the coexisting RAT communication will interfere with each other beyond the threshold level of interference.

22. The apparatus of claim 21, further comprising:
means for modifying a starting time for at least one of the NFC communication or the coexisting RAT communication upon a determination that the NFC communication and the coexisting RAT communication will interfere with each other beyond the threshold level of interference.

23. The apparatus of claim 21, wherein the interface provides a direct interface between the NFC subsystem and the coexisting RAT subsystem.

24. The apparatus of claim 21, wherein the NFC subsystem and the coexisting RAT subsystem are associated with a combination chip set.

25. The apparatus of claim 22, wherein the NFC communication comprises a NFC transmission, and wherein the coexisting RAT communication comprises a non-packetized content reception, and wherein the means for modifying are further configured to:
detect a lull in the non-packetized content reception; and
delay the NFC transmission to coincide with the lull.

26. The apparatus of claim 25, wherein the non-packetized content reception is frequency modulation (FM) content, and wherein the lull is detected based on reception of signal with a frequency that stays within a threshold bound for a threshold duration.

27. The apparatus of claim 25, wherein the non-packetized content reception is amplitude modulation (AM) content, and wherein the lull is detected based on reception of signal with an amplitude that stays within a threshold bound for a threshold duration.

28. The apparatus of claim 21, wherein the NFC communication comprises a NFC polling transmission, and wherein the coexisting RAT communication comprises at least one of: a delivery traffic indication message (DTIM) reception, or page scanning.

29. An apparatus for communications, comprising:
means for detecting, by an interface, that a near field communication (NFC) subsystem has established a NFC connection;
means for providing a message, via the interface, to radio access technology (RAT) subsystem to establish a link or perform a handover based on the detection;
means for determining whether the NFC connection and the link will interfere with each other beyond a threshold level of interference; and
means for performing one of sending an indication to mute to the RAT subsystem or sending an indication to transmit to the NFC subsystem during a lull in an active transmission phase of the link upon determining that the NFC connection and the link will interfere with each other beyond the threshold level of interference.

30. The apparatus of claim 29, wherein the interface provides a direct interface between the NFC subsystem and a coexisting RAT subsystem, and wherein the NFC subsystem and the coexisting RAT subsystem are associated with a combination chip set.

31. An apparatus for wireless communications, comprising:
a near field communication (NFC) subsystem;
one or more coexisting radio access technology (RAT) subsystems;
an interface coupled to the NFC subsystem and at least one of one or more RAT subsystems and configured to:
detect that a NFC communication associated with the NFC subsystem and a coexisting RAT communication associated with a coexisting RAT subsystem are to occur within a threshold time of each other;
determine whether the NFC communication and the coexisting RAT communication will interfere with each other beyond a threshold level of interference;
align timing for the NFC communication and the coexisting RAT communication upon a determination that the NFC communication and the coexisting RAT communication will not interfere with each other beyond the threshold level of interference; and
perform one of sending an indication to mute to the coexisting RAT subsystem or sending an indication to transmit to the NFC subsystem during a lull in an active transmission phase of the coexisting RAT communication upon determining that the NFC communication and the coexisting RAT communication will interfere with each other beyond the threshold level of interference.

32. The apparatus of claim 31, wherein the interface is further configured to:
modify a starting time for at least one of the NFC communication or the coexisting RAT communication upon a determination that the NFC communication and the coexisting RAT communication will interfere with each other beyond the threshold level of interference.

33. The apparatus of claim 31, wherein the interface provides a direct interface between the NFC subsystem and the coexisting RAT subsystem.

34. The apparatus of claim 31, wherein the NFC subsystem and the coexisting RAT subsystem are associated with a combination chip set.

35. The apparatus of claim 32, wherein the NFC communication comprises a NFC transmission, and wherein the coexisting RAT communication comprises a non-packetized content reception, and wherein the interface is further configured to:
  detect a lull in the non-packetized content reception; and
  delay the NFC transmission to coincide with the lull.

36. The apparatus of claim 35, wherein the non-packetized content reception is frequency modulation (FM) content, and wherein the lull is detected based on reception of signal with a frequency that stays within a threshold bound for a threshold duration.

37. The apparatus of claim 35, wherein the non-packetized content reception is amplitude modulation (AM) content, and wherein the lull is detected based on reception of signal with an amplitude that stays within a threshold bound for a threshold duration.

38. The apparatus of claim 31, wherein the NFC communication comprises a NFC polling transmission, and wherein the coexisting RAT communication comprises at least one of: a delivery traffic indication message (DTIM) reception, or page scanning.

39. An apparatus for wireless communications, comprising:
  a near field communication (NFC) subsystem;
  one or more coexisting radio access technology (RAT) subsystems;
  an interface coupled to the NFC subsystem and at least one of one or more RAT subsystems and configured to:
    detect that the NFC subsystem has established a NFC connection;
    provide a message, via the interface, to the at least one of the one or more RAT subsystems to establish a link or perform a handover based on the detection;
    determine whether the NFC connection and the link will interfere with each other beyond a threshold level of interference; and
    perform one of sending an indication to mute to the one or more RAT subsystem or sending an indication to transmit to the NFC subsystem during a lull in an active transmission phase of the link upon determining that the NFC connection and the link will interfere with each other beyond the threshold level of interference.

40. The apparatus of claim 39, wherein the interface provides a direct interface between the NFC subsystem and a coexisting RAT subsystem, and wherein the NFC subsystem and the coexisting RAT subsystem are associated with a combination chip set.

\* \* \* \* \*